United States Patent
Moore et al.

(10) Patent No.: US 7,305,537 B1
(45) Date of Patent: Dec. 4, 2007

(54) METHOD AND SYSTEM FOR I/O SCHEDULER ACTIVATIONS

(75) Inventors: William H. Moore, Fremont, CA (US); Jeffrey S. Bonwick, Los Altos, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 322 days.

(21) Appl. No.: 11/069,176

(22) Filed: Mar. 1, 2005

(51) Int. Cl.
*G06F 12/00* (2006.01)

(52) U.S. Cl. .................. 711/167; 711/151; 711/158

(58) Field of Classification Search .............. None
See application file for complete search history.

(56) References Cited

U.S. PATENT DOCUMENTS

| | | |
|---|---|---|
| 5,761,501 A | 6/1998 | Lubbers et al. |
| 5,787,482 A | 7/1998 | Chen et al. |
| 6,078,998 A | 6/2000 | Kamel et al. |
| 6,502,205 B1 * | 12/2002 | Yanai et al. ................. 714/7 |
| 6,674,718 B1 * | 1/2004 | Heddes et al. ............ 370/230 |
| 6,760,808 B2 * | 7/2004 | Peters et al. .............. 711/114 |
| 6,792,484 B1 * | 9/2004 | Hook ........................ 710/52 |
| 6,871,011 B1 | 3/2005 | Rahman et al. |
| 7,069,356 B2 * | 6/2006 | Meyer et al. .............. 710/52 |
| 7,100,074 B2 | 8/2006 | Watanabe et al. |
| 2005/0044289 A1 | 2/2005 | Hendel et al. |

OTHER PUBLICATIONS

Nievergelt, J.; "Binary Search Trees and File Organization"; Computing Surveys, vol. 6, No. 3, Sep. 1974; pp. 195-207 (13 pages).

* cited by examiner

*Primary Examiner*—Reginald Bragdon
*Assistant Examiner*—Mehdi Namazi
(74) *Attorney, Agent, or Firm*—Osha Liang LLP (57) ABSTRACT

A method for storing data, that includes receiving a request to store data in a storage pool, queuing the request in an Input/Output (I/O) queue, and issuing the request from the I/O queue upon receipt of a completion interrupt from the storage pool.

20 Claims, 7 Drawing Sheets

METHOD AND SYSTEM FOR I/O SCHEDULER ACTIVATIONS

BACKGROUND

A typical operating system includes a file system. The file system provides a mechanism for the storage and retrieval of files and a hierarchical directory structure for the naming of multiple files. More specifically, the file system stores information provided by the user (i.e., data) and information describing the characteristics of the data (i.e., metadata). The file system also provides extensive programming interfaces to enable the creation and deletion of files, reading and writing of files, performing seeks within a file, creating and deleting directories, managing directory contents, etc. In addition, the file system also provides management interfaces to create and delete file systems. File systems are typically controlled and restricted by operating system parameters. For example, most operating systems limit the maximum number of file names that can be handled within their file system. Some operating systems also limit the size of files that can be managed under a file system.

An application, which may reside on the local system (i.e., computer) or may be located on a remote system, uses files as an abstraction to address data. Conventionally, this data is stored on a storage device, such as a disk. To access a file, the operating system (via the file system) typically provides file manipulation interfaces to open, close, read, and write the data within each file. More specifically, the file system stores data on the storage device by managing the allocation of space within the storage device. Typically, the volume manager provides space which is managed by the file system. Two common types of file system space allocation strategies are known as block-based allocation and extent-based allocation. Block-based allocation creates incremental disk space for each file each time the file is extended (i.e., modified via a write request to add information), whereas extent-based allocation creates a large series of contiguous blocks (i.e., extents) each time the file exhausts the space available in the file's last extent.

When allocating space, both block-based and extent-based allocation use space provided by the volume manager. The volume manager allows multiple physical disks to be used as a single volume (i.e., a virtual disk) to provide larger consolidated storage sizes and simpler management. The volume manager allows users to organize data along volume boundaries (i.e., each volume has physical disk space allocated to the volume such that the volume is tied only to that dedicated physical disk). The volume manager is typically implemented as a separate layer between the physical disks and the file system, and is presented to the user as a virtual disk device. In other words, volume managers organize the collections of physical devices (e.g., disks) into virtual devices. Additionally, the space allocated within the volume manager is handled by the file system. Consequently, the volume manager is not aware of which blocks within the available storage space are in use and which blocks are free for data to be stored.

Further, file systems may be mounted on the virtual disk devices. Thus, physical disks are partitioned and allocated to multiple virtual disk devices, and each virtual disk device is capable of having a file system that exclusively uses that particular virtual disk device. A request to access a file is typically performed by an application, via the file system, using a file name and logical offset. This file name and logical offset (i.e., the manner in which applications express I/O requests) corresponds to a location within the virtual disk device. Subsequently, the request is translated to physical disk space on the storage device by the volume manager, allowing the user of the application to access the data within a particular file.

Operating systems typically include functionality to queue I/O requests (i.e., place the I/O requests in a queue at the file system level) prior to issuing the I/O requests to disk. Periodically, the operating system issues all the queued I/O requests to disk. The operating systems typically use a periodic timer that triggers the operating systems to processes the queue (i.e., flush the queue) at specific time intervals. Alternatively, operating systems may implement a policy of issuing every I/O request that is received immediately to disk, thereby not requiring a queue or a periodic timer.

SUMMARY

In general, in one aspect, the invention relates to a method for storing data, comprising receiving a request to store data in a storage pool, queuing the request in an Input/Output (I/O) queue, and issuing the request from the I/O queue upon receipt of a completion interrupt from the storage pool.

In general, in one aspect, the invention relates to a system for storing data, comprising a storage pool configured to store data and configured to issue a completion interrupt when a request to store data is processed by the storage pool, an I/O queue configured to store the request, and an I/O scheduler configured to issue the request from the I/O queue to the storage pool upon receipt of the completion interrupt.

In general, in one aspect, the invention relates to a computer readable medium comprising software instructions for enabling a computer system under the control of a processor, to receive a request to store data in a storage pool, queue the request in an Input/Output (I/O) queue, and issue the request from the I/O queue upon receipt of a completion interrupt from the storage pool.

In general, in one aspect, the invention relates to a plurality of nodes, comprising a storage pool configured to store data configured to issue a completion interrupt when a request to store data is processed by the storage pool, an I/O queue configured to store the request, and an I/O scheduler configured to issue the request from the I/O queue to the storage pool upon receipt of the completion interrupt, wherein the storage pool is located on at least one of the plurality of nodes, wherein the I/O queue is located on at least one of the plurality of nodes, wherein the I/O scheduler is located at least one of the plurality of nodes.

Other aspects of the invention will be apparent from the following description and the appended claims.

DETAILED DESCRIPTION

Specific embodiments of the invention will now be described in detail with reference to the accompanying figures. Like elements in the various figures are denoted by like reference numerals for consistency. Further, the use of "ST" in the drawings is equivalent to the use of "Step" in the detailed description below.

In the following detailed description of embodiments of the invention, numerous specific details are set forth in order to provide a more thorough understanding of the invention. In other instances, well-known features have not been described in detail to avoid obscuring the invention.

In general, embodiments of the invention relate to a method and system for processing a file system level I/O queue. Embodiments of the invention provide a mechanism for automatically adapting the I/O scheduler's behavior with respect to the current workload of the file system. Further, embodiments of the invention use an I/O completion interrupt to activate an I/O scheduler to process an I/O queue. Embodiments of the invention provide a method to process an I/O queue at the file system level.

One or more embodiments of the invention allow the I/O queue to be processed based on the workload of the system. Further, embodiments of the invention provide a method for processing I/O requests such that on a lightly loaded system, an I/O request spends little or no time in the I/O queue and thus has little added latency. Further, as the load increases, the average I/O queue residence time for each I/O request increases, thereby increases increasing I/O request bandwidth due to the excess of time for aggregation and re-ordering of I/O requests in the I/O queue.

Figure 1:
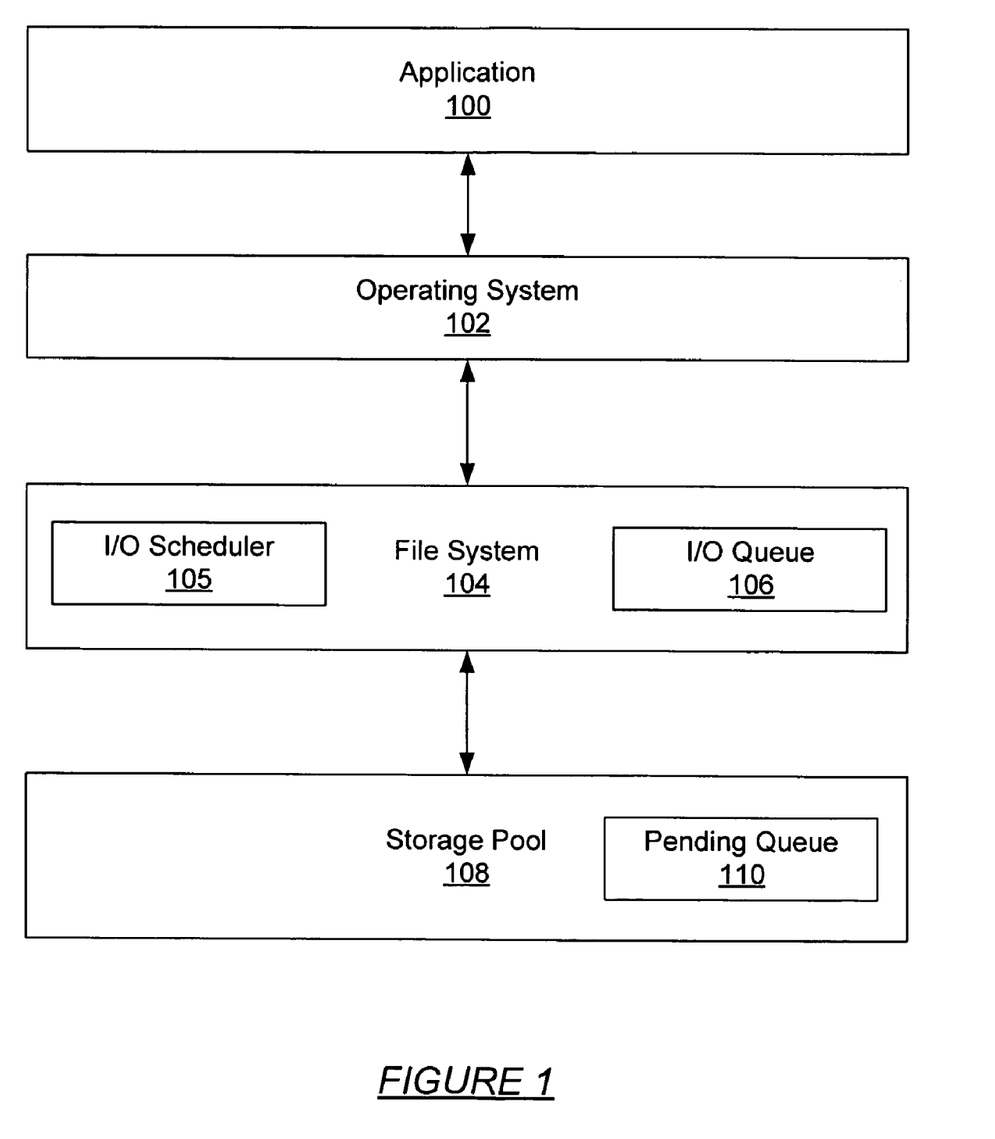
FIG. 1 shows a system architecture in accordance with one embodiment of the invention.

FIG. 1 shows a system architecture in accordance with one embodiment of the invention. The system architecture includes an application (100) interfacing with an operating system (102). Further, the operating system (102) includes functionality to interact with a file system (104), which in turn interfaces with a storage pool (108). The operating system (102) typically interfaces with the file system (104) via a system call interface (not shown). The operating system (102) provides operations for users to access files within the file system (104). These operations may include read, write, open, close, etc. In one embodiment of the invention, the file system (104) is an object-based file system (i.e., both data and metadata are stored as objects). More specifically, the file system (104) includes functionality to store both data and corresponding metadata in the storage pool (108). Thus, the aforementioned operations provided by the operating system (102) correspond to operations on objects.

More specifically, in one embodiment of the invention, a request to perform a particular operation (i.e., a transaction) is forwarded from the operating system (102), via the system call interface, to the file system (104). In one embodiment of the invention, the file system (104) translates the request to perform an operation on an object directly to a request to perform a read or write operation (i.e., an I/O request) at a physical location within the storage pool (108). Further, the file system (104) includes functionality to write the data into the storage pool (108).

In accordance with one embodiment of the invention, file system (104) may include an I/O management module (not shown), a compression module (not shown), an encryption module (not shown), a checksum module (not shown), and a metaslab allocator (not shown). Each of these aforementioned modules may be used by the file system (104) to read data from and/or write data to the storage pool (108). Each of the aforementioned modules is detailed below.

In one embodiment of the invention, the I/O management module (not shown) receives I/O requests and groups the I/O requests into transaction groups. The compression module (not shown) provides functionality to compress larger logical blocks into smaller segments, where a segment is a region of physical disk space. Further, in one embodiment of the invention, the encryption module (not shown) provides various data encryption algorithms. The data encryption algorithms may be used, for example, to prevent unauthorized access. In one embodiment of the invention, the checksum module (not shown) includes functionality to calculate a checksum for data and metadata within the storage pool. The checksum may be used, for example, to ensure data has not been corrupted. As discussed above, the file system (104) provides an interface to the storage pool (108) and manages allocation of storage space within the storage pool (108). In one embodiment of the invention, the file system (104) uses the metaslab allocator (not shown) to manage the allocation of storage space in the storage pool (108).

In one embodiment of the invention, the storage pool (108) includes one or more physical disks. Further, in one embodiment of the invention, the storage capacity of the storage pool (108) may increase and decrease dynamically as physical disks are added and removed from the storage pool. In addition, the storage pool (108) may also contain one or more pending queues (110). The pending queue (110) corresponds to a data structure that stores I/O requests received from the file system (104) prior to the I/O requests being processed by the disk. Depending on the implementation of the storage pool (108), there may be one pending queue (110) per disk within the storage pool (108), one pending queue (110) for a given portion of the storage pool (108), one pending queue (110) for the entire storage pool (108).

In one embodiment of the invention, the file system (104) includes at least one I/O queue (106). Each I/O queue (e.g., I/O queue (106)) is associated with a physical disk in the storage pool (108). Each I/O queue (e.g., I/O queue (106)) typically holds the I/O requests for a particular physical disk within the storage pool (108). Alternatively, there may be one I/O queue (106) for the entire storage pool (108) (or for a portion of the storage pool (108)). In one embodiment of the invention, the I/O queue(s) (106) may be implemented in a manner that does not include any ordering of the I/O requests within the I/O queue. Alternatively, the file system (104) may includes functionality to order the I/O requests in each of the I/O queues (e.g., I/O queue (106)). In one embodiment of the invention, the file system (104) includes functionality to order the I/O requests using a quantized deadline (described below in FIG. 6) associated with the I/O request and a logical block address (LBA) associated with the I/O request. The ordering of the I/O requests within the I/O queue (106) is described in FIG. 6 below.

In one embodiment of the invention, the file system (104) may also include an I/O scheduler (105). The I/O scheduler (105) typically includes functionality to determine when to issue I/O requests (queued or non-queued I/O requests) to one or more disks in the storage pool (108). In one embodiment of the invention, the I/O scheduler (105) includes functionality to issue an I/O request to a disk in the storage pool (108) using a Small Computer System Interface (SCSI) command. In one embodiment of the invention, when the disk completes the I/O request, the disk sends a SCSI packet back to the file system (104), or more specifically to the I/O scheduler (105) within the file system (104). In one embodiment of the invention, the SCSI packet sent to the file system (104) includes information relevant to the I/O request completed. For example, the SCSI packet may include information indicating whether the I/O request was completed successfully, residual portions of the I/O request that were not written to disk, flags corresponding to errors that occurred during the completion of the I/O request, etc.

Further, in one embodiment of the invention, the SCSI packet may include a completion interrupt. In one embodiment of the invention, the completion interrupt corresponds to a function pointer in the SCSI packet. When the I/O scheduler (105) receives a SCSI packet containing a completion interrupt, the I/O scheduler (105) is activated and proceeds to determine whether to issue additional I/O requests to the storage pool (108). An embodiment for determining whether to issue additional I/O requests to the storage pool (108) is described in FIG. 3 below.

Those skilled in the art will appreciate that while the aforementioned discussion indicated that the completion interrupt may be communicated to the file system using the SCSI protocol, that the invention is not limited to implementations using the SCSI protocol. More specifically, embodiments of the invention may be implemented using protocols, such as, the Integrated Drive Electronics (IDE) protocol, the Musical Instrument Digital Interface (MIDI) protocol, or any other protocol that enables communication of the completion interrupt (or similar information) from the disk to the file system.

Figure 2:
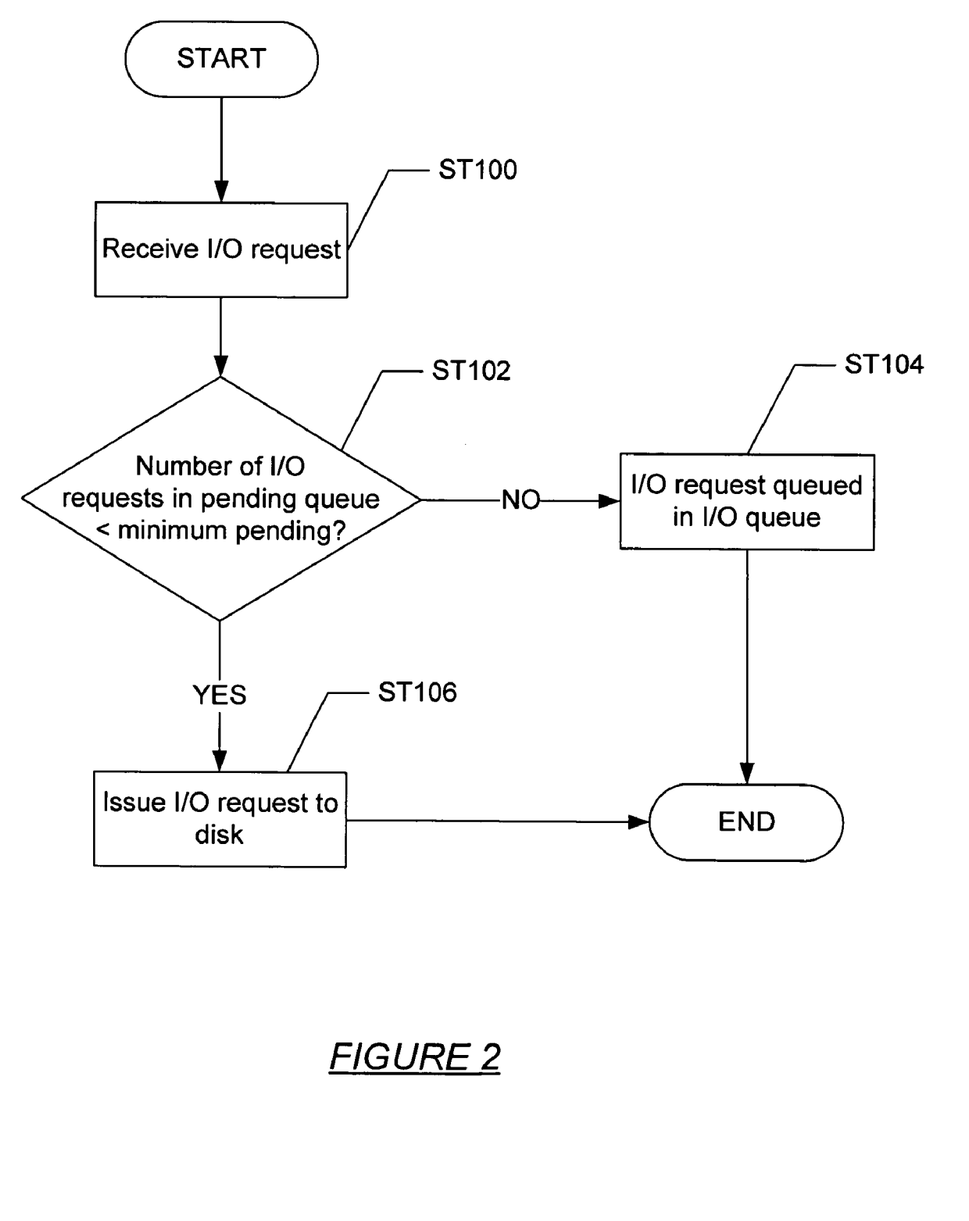
FIGS. 2 and 3 show flowcharts in accordance with one embodiment of the invention.
Figure 3:
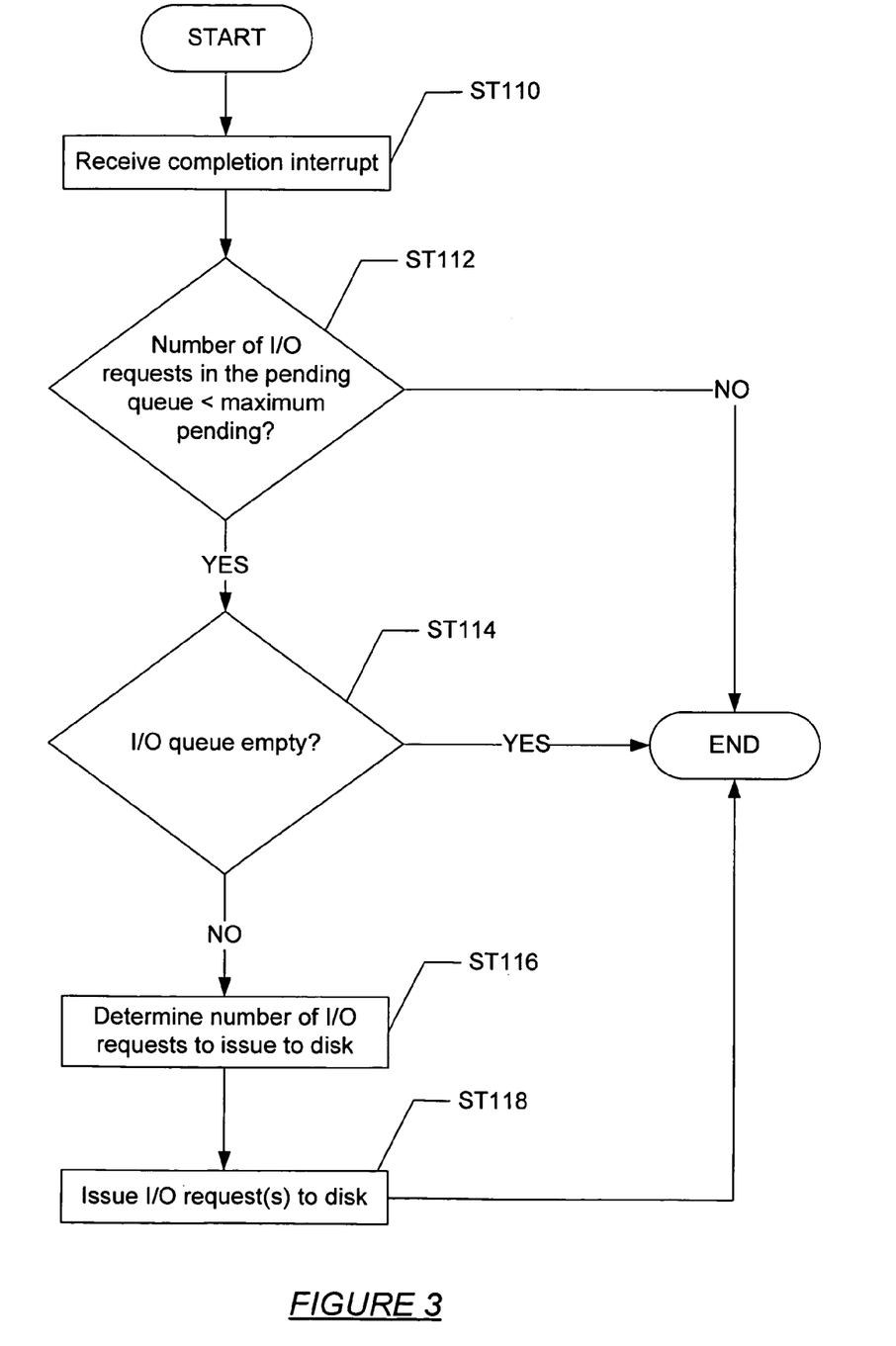

FIGS. 2 and 3 show flowcharts in accordance with one or more embodiments of the invention. FIG. 2 shows a flowchart detailing the steps performed when an I/O request is received by a file system in accordance with one embodiment of the invention. Initially, an I/O request is received by the file system (ST100). Typically, the I/O request is received from another process such as the operating system, etc. The file system (or more specifically the I/O scheduler within the I/O queue) subsequently determines whether the number of I/O requests in the corresponding pending queue is less than minimum pending (ST102). In one embodiment of the invention, the minimum pending corresponds to a minimum number of I/O requests that may be present in the pending queue in order for the I/O scheduler to issue an I/O request directly to disk (as opposed to queuing the I/O request in the I/O queue). If there is more than one pending queue, then each pending queue may have a corresponding minimum pending.

If the number of the number of I/O requests in the corresponding pending queue is less than minimum pending, then the I/O request is issued to disk (ST106). Once the I/O request is issued to disk, the I/O request may be stored in the pending queue waiting to the processed by the disk. Alternatively, if the number of the number of I/O requests in the corresponding pending queue is not less than minimum pending, then the I/O request is queued in the I/O queue (ST104). In one embodiment of the invention, the minimum pending corresponds to one I/O request. Thus, if more than one I/O request exists in the pending queue, then additional I/O requests are queued in the I/O queue.

Once an I/O request is placed in the I/O queue, the I/O request remains in the I/O queue until the I/O queue is issued to disk. As noted above, an I/O scheduler operating at the file system level may be used to issue the I/O requests in the I/O queue to disk. In one embodiment of the invention, the event that triggers the I/O scheduler to issue a queued I/O request to disk is the receipt of a completion interrupt. As discussed above, a completion interrupt is received each time an I/O request is successfully processed by the disk. FIG. 3 shows a flowchart of the steps performed by the I/O scheduler when a completion interrupt is received.

Initially, a completion interrupt is received (ST110). The receipt of the completion interrupt subsequently "activates" the I/O scheduler. Once the I/O scheduler is activated, the I/O scheduler determines whether the number of I/O requests in the pending queue is less than the maximum pending (ST112). In one embodiment of the invention, maximum pending corresponds to the maximum number of I/O requests that may be queued in the pending queue at any given time. In one embodiment of the invention, maximum pending is 35 I/O requests. If there is more than one pending queue, then each pending queue may have a corresponding maximum pending.

If the number of I/O requests in the pending queue is not less than the maximum pending (i.e., the pending queue already contains the maximum number of I/O requests), then the I/O scheduler does not issue any I/O requests. Alternatively, if the number of I/O requests in the pending queue is less than the maximum pending, then the I/O scheduler proceeds to determine whether the I/O queue is empty (i.e., are there any I/O requests to issue) (ST114). If the I/O queue is empty, then the I/O scheduler does not issue any I/O requests to disk. Alternatively, if the I/O queue is not empty then the I/O scheduler proceeds to determine the number of I/O requests to issue to disk (ST116).

In one embodiment of the invention, the number of I/O requests to issue to disk is determined using an exponential algorithm. In one embodiment of the invention, the exponential algorithm dictates that for every completion interrupt received by the I/O scheduler, the I/O scheduler issues "x" number of I/O requests.

In one embodiment of the invention, x is two. Thus, for every completion interrupt received by the I/O scheduler, the I/O scheduler issues two I/O requests. Those skilled in the art will appreciate that other values of x may be used. Further, other algorithms may be used to determine the number of I/O requests to issue to the disk.

Once the number of I/O requests to issue to disk has been determined, the I/O scheduler determines whether the number of I/O requests to issue to disk causes the number of I/O requests in the pending queue to exceed maximum pending. If the number of I/O requests to issue to disk results in exceeding maximum pending, then the number of I/O requests to issue to disk is reduced such that maximum pending is not exceeded. Once the final number of I/O requests to issue to disk has been determined, the I/O requests are issued to disk (ST118).

Those skilled in the art will appreciate that minimum pending, maximum pending, and the algorithm used to determine the number of I/O requests to issue upon receipt of a completion interrupt may all be tuned to meet the specific performance requirements of the file system and associated storage pool. Further, those skilled in the art will appreciate that the aforementioned variables and algorithm may be adjusted in manner that leverages the ordering algorithms used by the I/O queue.

Figure 4:
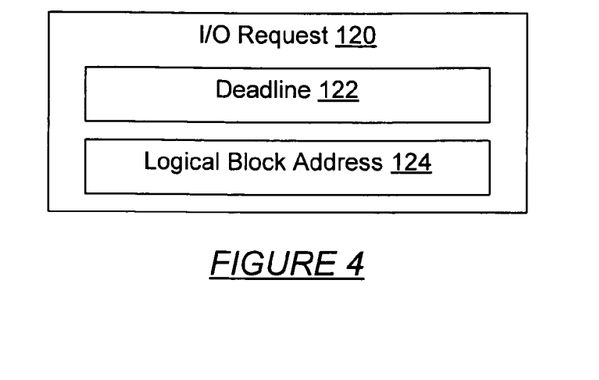
FIG. 4 shows an I/O request in accordance with one embodiment of the invention.

The following discussion details an embodiment for ordering the I/O queue in accordance with one embodiment of the invention. FIG. 4 shows an I/O request in accordance with one embodiment of the invention. The I/O request (120) typically includes a deadline (122) and a logical block address (LBA) (124). The deadline (122) may correspond to an actual deadline (e.g., a time by which a the I/O request must be issued, or a time frame during which the I/O request must be issued). Alternatively, the deadline (122) may correspond to priority such as: high priority (i.e., complete as soon as possible—may be used with I/O requests from real-time applications as well as synchronous requests), medium priority (i.e., complete soon, but not necessarily immediately—may be used with high priority asynchronous requests), or low priority (i.e., complete eventually—may be used with low priority asynchronous requests). In one embodiment of the invention, the LBA (124) is an n-bit value that maps to a specific location on the physical disk.

Figure 5:
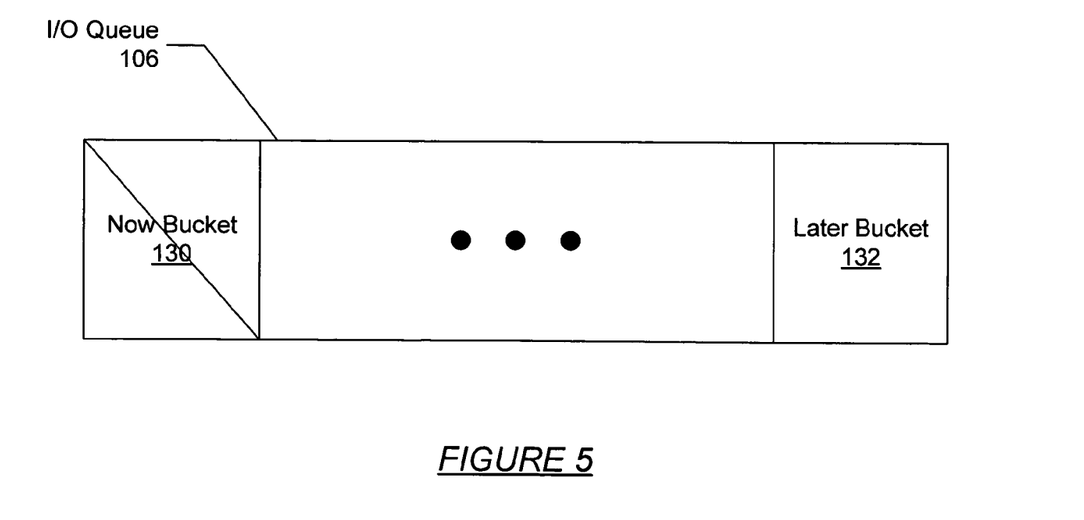
FIG. 5 shows an I/O queue in accordance with one embodiment of the invention.

FIG. 5 shows an I/O queue in accordance with one embodiment of the invention. The I/O queue (106) may include a number of buckets (e.g., a "now" bucket (130) and a "later" bucket (132)). In one embodiment of the invention each bucket (e.g., the "now" bucket (130) and the "later" bucket (132)) corresponds to a particular quantized deadline (described below in FIG. 6). Thus, all I/O requests with a given quantized deadline are stored in a particular bucket. Further, the I/O requests within an individual bucket (e.g., the "now" bucket (130) and the "later" bucket (132)) are ordered with respect to LBA (124 in FIG. 4).

In one embodiment of the invention, the I/O queue (106) is implemented as an AVL tree. The AVL tree corresponds to a partially-balanced binary tree. In one embodiment of the invention, the nodes (i.e., the I/O requests) within the AVL tree are ordered using the quantized deadline and LBA corresponding to the nodes. If an AVL tree is used to implement the I/O queue (106), then the buckets (e.g., the "now" bucket (130), the "later" bucket (132)) correspond to portions of the AVL tree. In another embodiment of the invention, the I/O queue (106) is implemented as a hash table having hash buckets. Those skilled in the art will appreciate that the I/O queue (106) may be implemented in using any data structure that can maintain the order of the I/O requests.

Figure 6:
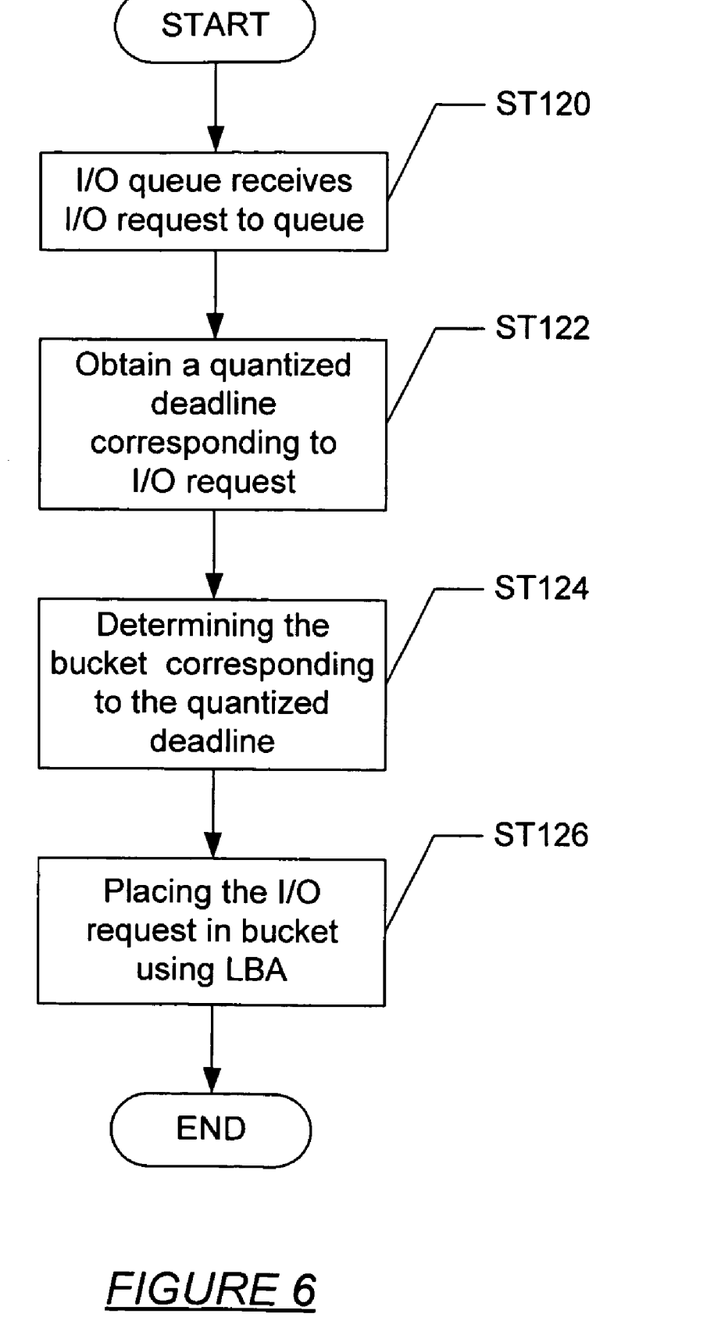
FIG. 6 shows a flowchart in accordance with one embodiment of the invention.

FIG. 6 shows a flowchart for placing an I/O request in an I/O queue in accordance with one embodiment of the invention. Initially, an I/O request is received by the I/O queue (or more specifically a process that manages the I/O queue) (ST120). A quantized deadline is subsequently determined for the I/O request (ST122). In one embodiment of the invention, a quantized deadline corresponds to a period of time when a particular request is to be performed. The quantized deadline is used to coarsely order the I/O request in the I/O queue. In one embodiment of the invention, the quantized deadlines are set in millisecond intervals. For example, the quantized deadlines may be set as: now (0-99 ms), soon (100-199 ms), and later (199 ms+). Thus, when an I/O request having a deadline of 75 ms is received, then the quantized deadline for the I/O request is considered "now." Note, the quantized deadlines may be set using any magnitude (e.g., seconds, millisecond, nanoseconds, etc.) and any duration of time interval. Further, the quantized deadlines may be identified using any type of label. In one embodiment of the invention, the intervals of the quantized deadlines may be adjusted such that the buckets corresponding to the quantized deadline contain only (or slightly more than) the number of I/O requests that may be processed prior to the I/O requests in the bucket expiring.

Once the quantized deadline for the I/O request is determined, the bucket corresponding to the quantized deadline is determined (ST124). In one embodiment of the invention, if the I/O queue is implemented as an AVL tree, then determining the bucket corresponding to the quantized deadline includes identifying the portion of the AVL tree that corresponds to the bucket. Alternatively, if the I/O queue is implemented as a hash table having hash buckets, then determining the bucket corresponding to the quantized deadline includes identifying the appropriate hash bucket.

Once the corresponding bucket is determined, the I/O request is placed in the bucket in an order determined by the LBA of the I/O request (ST126). In one embodiment of the invention, the LBA of the I/O request that is being inserted into the I/O queue is compared with the LBA's of the I/O requests already in the bucket, and then inserted into the appropriate location in the bucket. The insertion of the I/O request into the I/O queue includes inserting the I/O request into the appropriate location in the data structure implementing the I/O queue (e.g., linked list, an array, an AVL tree, etc).

Those skilled in the art will appreciate that while FIG. 6 details one embodiment for ordering the I/O requests in the I/O queue, other methods of ordering the I/O requests in the I/O queue may also be used.

Figure 7:
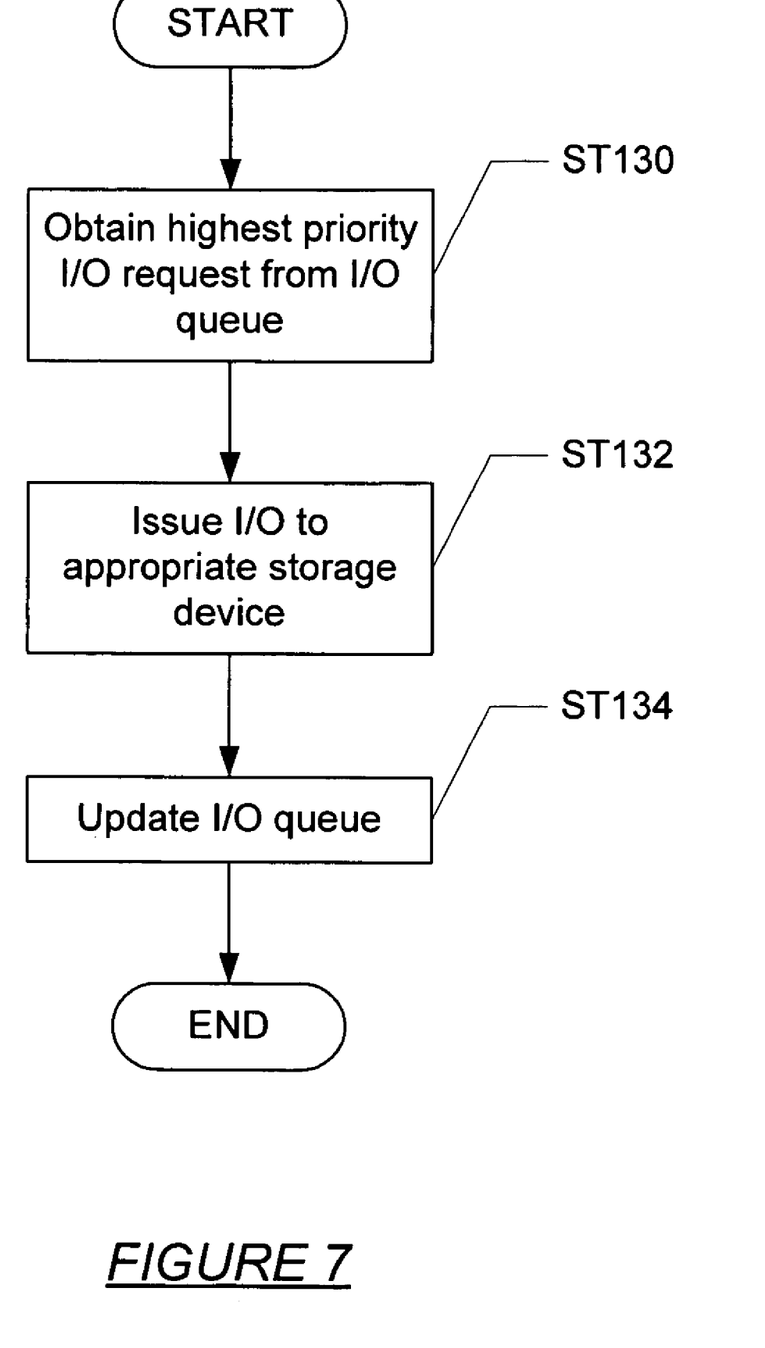
FIG. 7 shows a flowchart in accordance with one embodiment of the invention.

FIG. 7 shows a flowchart for processing the I/O request in the I/O queue in accordance with one embodiment of the invention. More specifically, after the I/O scheduler determines the number of I/O requests to issue to disk, the highest priority I/O request (or the "x" number of highest priority I/O requests) is obtained from the I/O queue (ST130). In one embodiment of the invention, the highest priority request corresponds to the I/O request in the "now" bucket with the highest priority based on LBA. If the I/O queue is implemented as an AVL tree, then the highest priority I/O request is the I/O request at the left most leaf of the AVL tree.

Once the highest priority I/O request has been received, the I/O request is issued to the appropriate storage device (e.g., a physical disk) (ST132). Once the highest priority I/O request has been issued, the highest priority I/O request is removed from the I/O queue, and the I/O queue is updated (ST134). In one embodiment of the invention, the I/O queue is updated by moving one or more I/O requests from a bucket at the back of the I/O queue to a bucket closer to the front of the I/O queue (e.g., from the "later" bucket to the "now" bucket). Alternatively, if the I/O queue is implemented as an AVL tree, then I/O queue is updated by rebalancing the AVL tree.

Those skilled in the art will appreciate that methods described in FIGS. 6 and 7 may occur concurrently within the system. As such, when new I/O requests are received by the file system, the file system places the I/O request in the I/O queue, thereby reordering the I/O queue. As noted above, the intervals of the quantized deadlines may be adjusted such that the buckets corresponding to the quantized deadline contain only (or slightly more than) the number of I/O requests that may be processed prior to the expiration of the deadlines of the I/O requests in the bucket. However, in some situations, all of the I/O requests in the bucket may not be able to be processed prior to the expiration of the deadlines of the I/O requests.

In such situations, in order to ensure that the I/O requests with expired deadlines are not preempted by other newly arriving high priority I/O requests, the unprocessed I/O requests (typically unprocessed I/O requests from the "now" bucket) are placed in an "immediate" bucket. The "immediate" bucket (not shown in FIG. 5) corresponds to a bucket that has a higher priority than the "now" bucket. Further, an I/O request may not be initially placed in the "immediate" bucket, rather, the I/O request may only move to the "immediate" bucket if the I/O request was previously in the "now" bucket and unprocessed while the I/O request's deadline expired. Further, when new I/O requests are received by the file system, the new I/O requests may only be placed in buckets with less priority than the "immediate"

bucket (i.e., in the "now" bucket, the "later" bucket, etc.). In this manner, the I/O requests with expired deadlines are processed.

Those skilled in the art will appreciate that while the aforementioned discussion of embodiments of the invention described a file system that functions without a volume manager, the invention may be implemented on a system architecture with a volume manager. Those skilled in the art will appreciate that while the above discussion of the embodiments of the invention used LBA to order the I/O requests within the corresponding buckets, the I/O request may be ordered using any criteria that minimizes latency or satisfies other performance requirement. The criteria may include information about disk geometry, other characteristics of the disk, etc.

Figure 8:
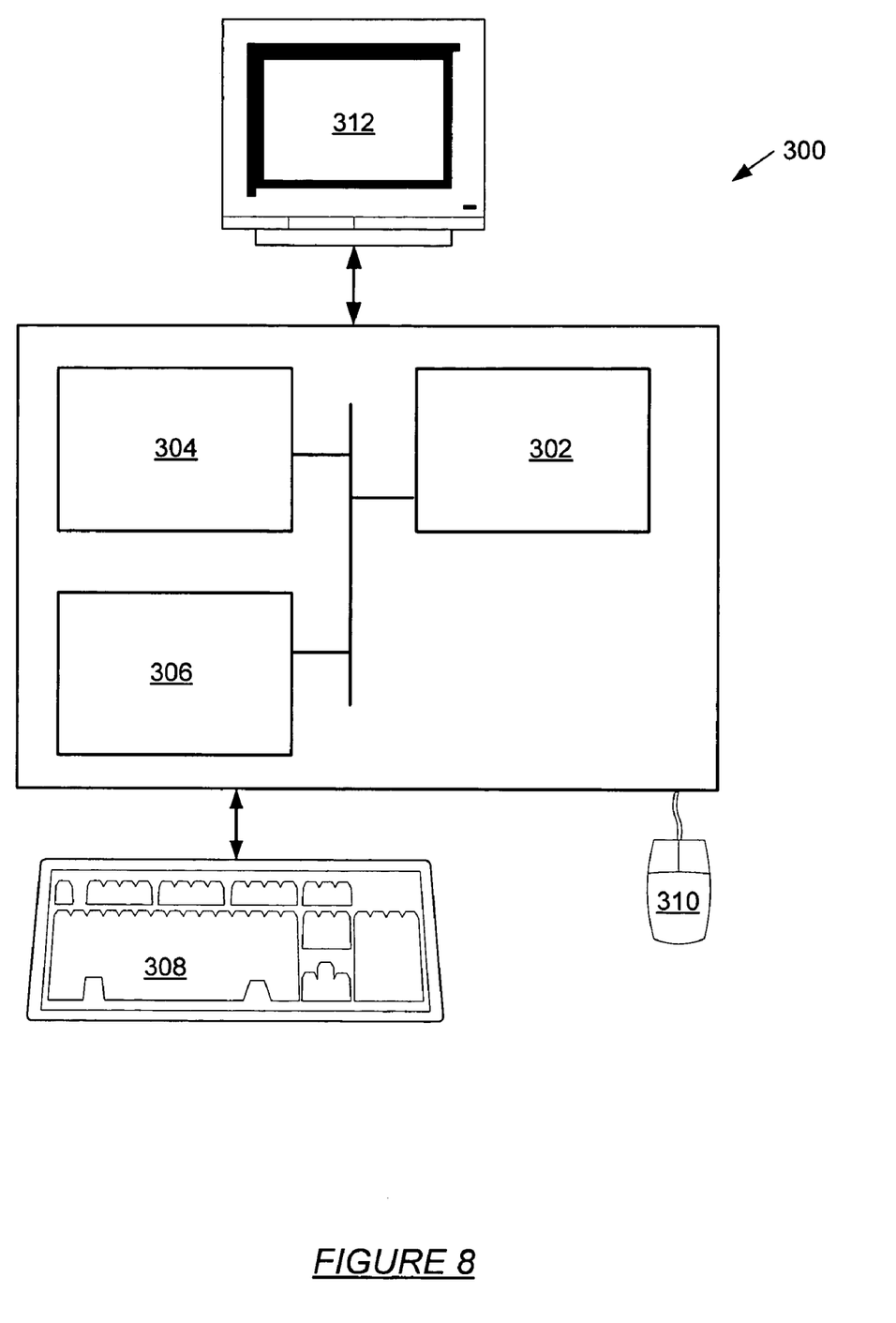
FIG. 8 shows a computer system in accordance with one embodiment of the invention.

The invention may be implemented on virtually any type of computer regardless of the platform being used. For example, as shown in FIG. 8, a computer system (200) includes a processor (202), associated memory (204), a storage device (206), and numerous other elements and functionalities typical of today's computers (not shown). The computer (200) may also include input means, such as a keyboard (208) and a mouse (210), and output means, such as a monitor (212). The computer system (200) is connected to a local area network (LAN) or a wide area network (e.g., the Internet) (not shown) via a network interface connection (not shown). Those skilled in the art will appreciate that these input and output means may take other forms.

Further, those skilled in the art will appreciate that one or more elements of the aforementioned computer system (200) may be located at a remote location and connected to the other elements over a network. Further, the invention may be implemented on a distributed system having a plurality of nodes, where each portion of the invention (e.g., file system, the storage pool, etc.) may be located on a different node within the distributed system. In one embodiment of the invention, the node corresponds to a computer system. Alternatively, the node may correspond to a processor with associated physical memory. Further, software instructions to perform embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for storing data, comprising:
   receiving a request to store data in a storage pool;
   queuing the request in an Input/Output (I/O) queue;
   issuing the request from the I/O queue;
   receiving a completion interrupt associated with the request from the storage pool;
   determining a number of subsequent requests to issue to the storage pool upon receipt of the completion interrupt, wherein determining the number of subsequent requests to issue to the storage pool comprises determining whether a pending queue has less than maximum pending requests;
   issuing no subsequent requests to the storage pool if the pending queue does not have less than maximum pending requests; and
   issuing the number of subsequent requests to the storage pool if there are requests in the I/O queue and the pending queue has less than maximum pending requests, wherein the number of requests issued to the storage pool does not result in the pending queue exceeding maximum pending requests.

2. The method of claim 1,
   wherein queuing the request in the I/O queue is performed when the pending queue associated with the storage pool has more than minimum pending I/O requests, and
   wherein a subsequent request is issued directly to the storage pool when the pending queue has less than the minimum pending requests.

3. The method of claim 1, wherein queuing the request comprises:
   determining a quantized deadline for the request; and
   placing the request in the I/O queue using the quantized deadline.

4. The method of claim 3, wherein the I/O queue comprises a plurality of buckets.

5. The method of claim 4, wherein the placing the request in the I/O queue comprises placing the request in one of the plurality of buckets corresponding to the quantized deadline.

6. The method of claim 5, wherein the request is ordered in the one of the plurality of buckets using a logical block address associated with the request.

7. The method of claim 1, wherein the I/O queue is an AVL tree and wherein queuing the request in the I/O queue comprises placing the request in the AVL tree with respect to a quantized deadline and a logical block address.

8. A system for storing data, comprising:
   a storage pool configured to store data and issue a completion interrupt when a request to store data is processed by the storage pool;
   an I/O queue configured to store the request; and
   an I/O scheduler configured to:
     issue the request from the I/O queue to the storage pool,
     receive the completion interrupt from the storage pool,
     determine a number of subsequent requests to issue to the storage pool upon receipt of the completion interrupt, wherein determining the number of subsequent requests comprises determining whether a pending queue has less than maximum pending requests,
     issue no subsequent requests to the storage pool if the pending queue does not have less than maximum pending requests, and
     issue the number of subsequent requests to the storage pool if there are requests in the I/O queue and the pending queue has less than maximum pending requests, wherein the number of subsequent requests issued to the storage pool does not result in the pending queue exceeding maximum pending requests.

9. The system of claim 8, further comprising:
   a file system configured to receive the request, determine a quantized deadline of the request, and place the request in the I/O queue using the quantized deadline of the request and a logical block address of the request.

10. The system of claim 9, wherein
    the request is placed in the I/O queue when the pending queue associated with the storage pool has more than minimum pending I/O requests, and
    wherein a subsequent request is issued directly to the storage pool when the pending queue has less than the minimum pending requests.

11. The system of claim 8, wherein the I/O queue comprises a plurality of buckets.

12. The system method of claim 11, wherein a file system is configured to place the request in one of the plurality of buckets corresponding to the quantized deadline.

13. The system of claim 12, wherein the request is ordered in the one of the plurality of buckets using a logical block address associated with the request.

14. The system of claim 8, wherein the I/O queue is an AVL tree and wherein the request is placed in the AVL tree with respect to a quantized deadline and a logical block address.

15. A computer readable medium comprising software instructions for enabling a computer system under the control of a processor, to:
  receive a request to store data in a storage pool;
  queue the request in an Input/Output (I/O) queue;
  issue the request from the I/O queue;
  receive a completion interrupt associated with the request from the storage pool;
  determine a number of subsequent requests to issue to the storage pool upon receipt of the completion interrupt, wherein software instructions for enabling the computer system to determine the number of subsequent requests comprises software instructions for enabling the computer system to determine whether a pending queue has less than maximum pending requests;
  issue no subsequent requests to the storage pool if the pending queue does not have less than maximum pending requests; and
  issue the number of subsequent requests to the storage pool if there are requests in the I/O queue and the pending queue has less than maximum pending requests, wherein the number of subsequent requests issued to the storage pool does not result in the pending queue exceeding maximum pending requests.

16. The computer readable medium of claim 15, further comprising software instructions for enabling the computer system to:
  queue the request in the I/O queue when the pending queue associated with the storage pool has more than minimum pending I/O requests; and
  issue a subsequent request directly to the storage pool when the pending queue has less than the minimum pending requests.

17. The computer readable medium of claim 15, wherein software instructions for enabling the computer system to queue the request comprises software instructions for enabling the computer system to:
  determine a quantized deadline for the request; and
  place the request in the I/O queue using the quantized deadline.

18. A plurality of nodes, comprising:
  a storage pool configured to store data and issue a completion interrupt when a request to store data is processed by the storage pool;
  an I/O queue configured to store the request; and
  an I/O scheduler configured to:
    issue the request from the I/O queue to the storage pool,
    receive the completion interrupt from the storage pool,
    determine a number of subsequent requests to issue to the storage pool upon receipt of the completion interrupt, wherein determining the number of requests comprises determining whether a pending queue has less than maximum pending requests,
    issue no subsequent requests to the storage pool if the pending queue does not have less than maximum pending requests, and
    issue the number of subsequent requests to the storage pool if there are requests in the I/O queue and the pending queue has less than maximum pending requests, wherein the number of subsequent requests issued to the storage pool does not result in the pending queue exceeding maximum pending requests,
  wherein the storage pool is located on at least one of the plurality of nodes,
  wherein the I/O queue is located on at least one of the plurality of nodes and
  wherein the I/O scheduler is located at least one of the plurality of nodes.

19. The plurality of nodes of claim 18, further comprising:
  a file system configured to receive the request, determine a quantized deadline of the request, and place the request in the I/O queue using the quantized deadline of the request and a logical block address of the request,
  wherein the file system is located on at least one of the plurality of nodes.

20. The plurality of nodes of claim 19, wherein
  the request is placed in the I/O queue when the pending queue associated with the storage pool has more than minimum pending I/O requests, and
  wherein a subsequent request is issued directly to the storage pool when the pending queue has less than the minimum pending requests.

* * * * *